US011733713B2

United States Patent
Rumbo et al.

(10) Patent No.: US 11,733,713 B2
(45) Date of Patent: Aug. 22, 2023

(54) SYSTEM AND METHOD FOR IMPROVED AIRCRAFT AND UAM CONTROL PATH ACCURACY INCLUDING DERIVATIVE SEGMENTS CONTROL

(71) Applicant: HONEYWELL INTERNATIONAL INC., Morris Plains, NJ (US)

(72) Inventors: Jim Rumbo, Phoenix, AZ (US);
Natasha Proctor, Phoenix, AZ (US);
Ryan Glaser, Phoenix, AZ (US)

(73) Assignee: HONEYWELL INTERNATIONAL INC., Charlotte, NC (US)

( * ) Notice: Subject to any disclaimer, the term of this patent is extended or adjusted under 35 U.S.C. 154(b) by 776 days.

(21) Appl. No.: 16/854,535

(22) Filed: Apr. 21, 2020

(65) Prior Publication Data
US 2021/0325903 A1  Oct. 21, 2021

(51) Int. Cl.
*G05D 1/08* (2006.01)
*B64D 43/00* (2006.01)
*G05D 1/10* (2006.01)
*G08G 5/00* (2006.01)

(52) U.S. Cl.
CPC ........... *G05D 1/0808* (2013.01); *B64D 43/00* (2013.01); *G05D 1/101* (2013.01); *G08G 5/0034* (2013.01)

(58) Field of Classification Search
CPC .... G05D 1/0808; G05D 1/101; G05D 1/0202; B64D 43/00; G08G 5/0034
See application file for complete search history.

(56) References Cited

U.S. PATENT DOCUMENTS

| 4,674,710 | A | 6/1987 | Rodriguez |
| 4,999,782 | A | 3/1991 | Be Van |
| 5,023,796 | A | 6/1991 | Kahler |
| 5,615,116 | A | 3/1997 | Gudat et al. |
| 6,389,333 | B1 | 5/2002 | Hansman et al. |
| 7,487,039 | B2 | 2/2009 | Rumbo et al. |
| 7,835,866 | B2 | 11/2010 | Tzidon |
| 8,086,362 | B2 * | 12/2011 | Dupre .................. G05D 1/0202 701/4 |

(Continued)

OTHER PUBLICATIONS

Samar, R., et al. "Lateral Control Implementation for an Unmanned Aerial Vehicle," Hindawi Publishing, ISRN Aerospace Engineering, vol. 2013, Artilce IDS 905865,14 pages, http://dx.doi.org/10.1155/2013/905865.

*Primary Examiner* — Thomas Ingram
(74) *Attorney, Agent, or Firm* — Lorenz & Kopf LLP

(57) ABSTRACT

A method for controlling a desired change in course for an aircraft is provided. The method comprises: determining a roll angle for a constant radius curve in a constant roll attitude lateral path segment of a lateral path to achieve the desired change in course; determining, for each of a first plurality of derivative lateral path segments between a first straight lateral path segment of the lateral path and the constant roll attitude lateral path segment and a second plurality of derivative lateral path segments between the constant roll attitude lateral path segment and a second straight lateral path segment of the lateral path, a derivative roll parameter to apply in the lateral path segment, wherein the derivative roll parameter comprises a constant roll acceleration value or a constant roll rate value; and causing the aircraft to sequentially execute a maneuver specified by the roll angle and, derivative roll parameters.

20 Claims, 3 Drawing Sheets

(56) References Cited

U.S. PATENT DOCUMENTS

| | | | |
|---|---|---|---|
| 9,233,750 B2 * | 1/2016 | Savarit | B64C 19/00 |
| 9,404,752 B2 | 8/2016 | Courteville et al. | |
| 11,610,337 B2 * | 3/2023 | Habib | B64C 39/024 |
| 2006/0015247 A1 | 1/2006 | Speer | |
| 2016/0063867 A1 * | 3/2016 | Zammit | G08G 5/025 |
| | | | 701/18 |
| 2021/0325903 A1 * | 10/2021 | Rumbo | G08G 5/0034 |

* cited by examiner

SYSTEM AND METHOD FOR IMPROVED AIRCRAFT AND UAM CONTROL PATH ACCURACY INCLUDING DERIVATIVE SEGMENTS CONTROL

TECHNICAL FIELD

Embodiments of the subject matter described herein relate generally to aerial vehicle flight control. More particularly, embodiments of the subject matter relate to the lateral path control law in an aerial vehicle.

BACKGROUND

The FMS (flight management system) on an aircraft may use a lateral path control law to control an aircraft to follow a ground path. Cross track error (XTK) and track angle error (TKE) exist between the actual aircraft path and the projected aircraft track. Because of these tracking errors buffers are placed around a projected aircraft track to prevent other aircraft from flying to close. Reducing the tracking error could allow for aircraft to fly closer together when flying in parallel tracks.

Hence, it is desirable to improve the control law to reduce tracking errors. Furthermore, other desirable features and characteristics of the present invention will become apparent from the subsequent detailed description and the appended claims, taken in conjunction with the accompanying drawings and the foregoing technical field and background.

SUMMARY

This summary is provided to describe select concepts in a simplified form that are further described in the Detailed Description. This summary is not intended to identify key or essential features of the claimed subject matter, nor is it intended to be used as an aid in determining the scope of the claimed subject matter.

In one embodiment, flight deck equipment including a controller for controlling a desired change in course in a lateral path of an aircraft is disclosed. The controller is configured to: determine a roll angle for a constant radius curve in a constant roll attitude lateral path segment of the lateral path to achieve the desired change in course at a current ground speed for the aircraft; determine, for each of a first plurality of derivative lateral path segments between a first straight lateral path segment of the lateral path and the constant roll attitude lateral path segment, a derivative roll parameter to apply in the lateral path segment, wherein the derivative roll parameter includes a constant roll acceleration value or a constant roll rate value; determine, for each of a second plurality of derivative lateral path segments between the constant roll attitude lateral path segment and a second straight lateral path segment of the lateral path, a derivative roll parameter to apply in the lateral path segment; and cause the aircraft to sequentially execute a maneuver specified by the roll angle, derivative roll parameters for the first plurality of lateral path segments, and derivative roll parameters for the second plurality of lateral path segments in appropriate lateral path segments of the lateral path to control the aircraft to complete the desired change in course in the lateral path. The lateral path includes, in order, the first straight lateral path segment, the first plurality of derivative lateral path segments, the constant roll attitude lateral path segment, the second plurality of derivative lateral path segments, and the second straight lateral path segment.

In another embodiment, a method in flight deck equipment for controlling a desired change in course in a lateral path of an aircraft is disclosed. The method includes: determining a roll angle for a constant radius curve in a constant roll attitude lateral path segment of the lateral path to achieve the desired change in course at a current ground speed for the aircraft; determining, for each of a first plurality of derivative lateral path segments between a first straight lateral path segment of the lateral path and the constant roll attitude lateral path segment, a derivative roll parameter to apply in the lateral path segment, wherein the derivative roll parameter includes a constant roll acceleration value or a constant roll rate value; determining, for each of a second plurality of derivative lateral path segments between the constant roll attitude lateral path segment and a second straight lateral path segment of the lateral path, a derivative roll parameter to apply in the lateral path segment; and causing the aircraft to sequentially execute a maneuver specified by the roll angle, derivative roll parameters for the first plurality of lateral path segments, and derivative roll parameters for the second plurality of lateral path segments in appropriate lateral path segments of the lateral path to control the aircraft to complete the desired change in course in the lateral path. The lateral path includes, in order, the first straight lateral path segment, the first plurality of derivative lateral path segments, the constant roll attitude lateral path segment, the second plurality of derivative lateral path segments, and the second straight lateral path segment.

Furthermore, other desirable features and characteristics will become apparent from the subsequent detailed description and the appended claims, taken in conjunction with the accompanying drawings and the preceding background.

BRIEF DESCRIPTION OF THE DRAWINGS

Embodiments of the subject matter will hereinafter be described in conjunction with the following drawing figures, wherein like numerals denote like elements, and wherein.

DETAILED DESCRIPTION

Figure 1:
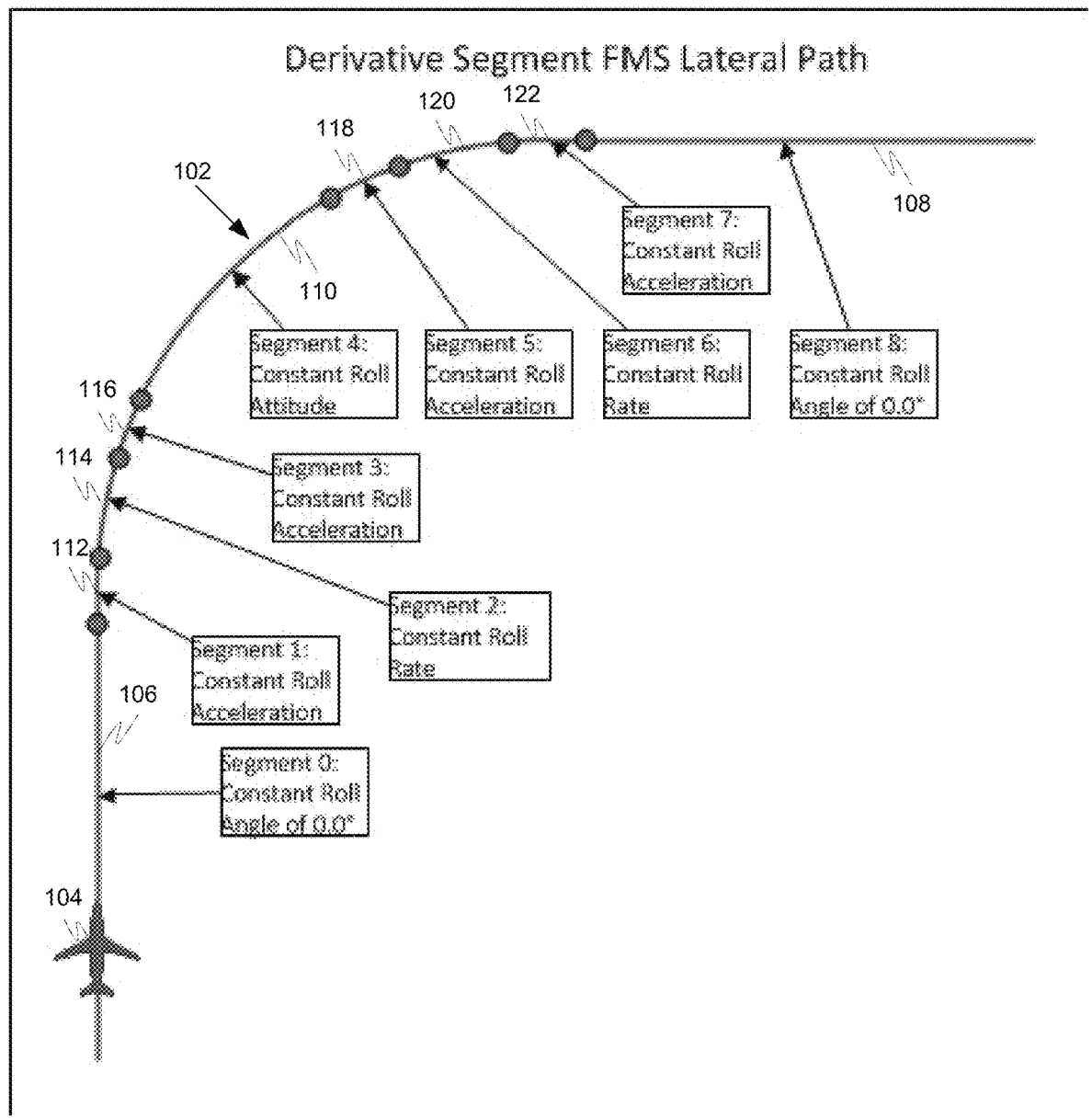
FIG. 1 is a diagram depicting an example lateral path section for an aircraft, in accordance with some embodiments.

The following detailed description is merely exemplary in nature and is not intended to limit the application and uses. Furthermore, there is no intention to be bound by any expressed or implied theory presented in the preceding technical field, background, summary, or the following detailed description. As used herein, the term "module" refers to any hardware, software, firmware, electronic control component, processing logic, and/or processor device, individually or in any combination, including without limitation: application specific integrated circuit (ASIC), a field-programmable gate-array (FPGA), an electronic circuit, a processor (shared, dedicated, or group) and memory that executes one or more software or firmware programs, a combinational logic circuit, and/or other suitable components that provide the described functionality.

Embodiments of the present disclosure may be described herein in terms of functional and/or logical block components and various processing steps. It should be appreciated that such block components may be realized by any number of hardware, software, and/or firmware components configured to perform the specified functions. For example, an embodiment of the present disclosure may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments of the present disclosure may be practiced in conjunction with any number of systems, and that the systems described herein is merely exemplary embodiments of the present disclosure.

For the sake of brevity, conventional techniques related to signal processing, data transmission, signaling, control, and other functional aspects of the systems (and the individual operating components of the systems) may not be described in detail herein. Furthermore, the connecting lines shown in the various figures contained herein are intended to represent example functional relationships and/or physical couplings between the various elements. It should be noted that many alternative or additional functional relationships or physical connections may be present in an embodiment of the present disclosure.

When tracking the lateral path of an aircraft (manned or unmanned), the FMS (flight management system) associated with an aircraft (on board or off board) uses straight path segments and constant radius arc path segments to follow a ground path. The FMS utilizes a lateral path control law to control the aircraft to follow the ground path. Cross track error (XTK), track angle error (TKE) and a nominal roll angle (Phinom) can be inputs for the lateral path control law, wherein Phinom is computed as the instantaneous roll angle required to hold a constant radius curve at a current ground speed, Phinom is set to zero for straight path segments, XTK is the perpendicular distance from the aircraft to the path, and TKE is the angle difference between the aircraft and the path.

When a ground path transitions from a straight path segment to a curve path segment or from a curve path segment to a straight path segment, the Phinom changes. Because an aircraft's roll response to the lateral path control law, when the Phinom changes, is not instantaneous, a non-zero XTK exists around the transitions. Also, the lateral path control law includes a roll acceleration and roll rate limit that applies limits to the roll command as the roll command transitions from a zero degree roll angle command (for a straight path segment) to a non-zero roll angle command (e.g., 25 degrees) required for a constant radius arc path segment or from a non-zero roll angle command to a zero degree roll angle command. The lateral path roll limiting along with the aircraft roll response causes the aircraft to generate the non-zero XTK around the path segment transitions.

The subject matter described herein discloses apparatus, systems, techniques and articles for adding derivative lateral path segments before and after straight to curve or curve to straight transitions that allow an aircraft to remain on path at transitions and generate a lower XTK error than would be generated if the derivative lateral path segments before and after straight to curve or curve to straight transitions were not used. The lateral derivative segments may include constant roll rate path segments and constant roll acceleration path segments that allow an aircraft to change its roll attitude in a more natural and controlled manor.

FIG. 1 is a diagram depicting an example lateral path section 102 for an aircraft 104. The example lateral path section 102 includes a first straight lateral path segment 106, a second straight lateral path segment 108, and a constant roll angle segment 110 disposed between the first straight lateral path segment 106 and the second straight lateral path segment 108. The example lateral path section 102 also includes a plurality of derivative lateral path segments. The derivative lateral path segments include, in order, a first constant roll acceleration lateral path segment 112, a first constant roll rate lateral path segment 114, and a second constant roll acceleration lateral path segment 116 disposed between the first straight lateral path segment 106 and the constant roll angle segment 110. The derivative lateral path segments also include, in order, a third constant roll acceleration lateral path segment 118, a second constant roll rate lateral path segment 120, and a fourth constant roll acceleration lateral path segment 122 disposed between the constant roll angle segment 110 and the second straight lateral path segment 108.

Listed in Table 1 are descriptions for the lateral derivative segments.

| Roll Segment | Derivative Type | Description |
| --- | --- | --- |
| Constant Roll Angle | Acceleration | A constant roll angle will generate a constant aircraft acceleration |
| Constant Roll Rate | Jerk | A constant roll rate will generate a constant aircraft jerk |
| Constant Roll Acceleration | Snap | A constant roll acceleration will generate a constant aircraft Snap |

The constant roll angle segment 110 is a lateral path segment wherein the aircraft is operated with a constant roll angle, which will generate a constant aircraft acceleration. The constant roll rate segments 114, 120, are lateral path segments wherein the aircraft is operated with a constant roll rate that will generate a constant aircraft jerk. The constant roll acceleration segments 112, 116, 118, 122, are lateral path segments wherein the aircraft is operated with a constant roll acceleration that will generate a constant aircraft snap.

A maneuver from wings level to a constant roll angle during a turn will be accomplished with a series of lateral derivative segments as shown in table 2.

| Segment Number | Roll State | Active Roll Segment |
| --- | --- | --- |
| 0 | Wings level, Constant roll angle of zero | Zero Acceleration Straight Segment |
| 1 | Constant Roll Acceleration | Snap Segment |
| 2 | Constant Roll Rate | Jerk Segment |
| 3 | Constant Roll Acceleration | Snap Segment |
| 4 | Roll Angle, Constant roll angle of Phinom | Constant Radius Acceleration Segment |
| 5 | Constant Roll Acceleration | Snap Segment |
| 6 | Constant Roll Rate | Jerk Segment |
| 7 | Constant Roll Acceleration | Snap Segment |
| 8 | Wings level, Constant roll angle of zero | Zero Acceleration Straight Segment |

Figure 2:
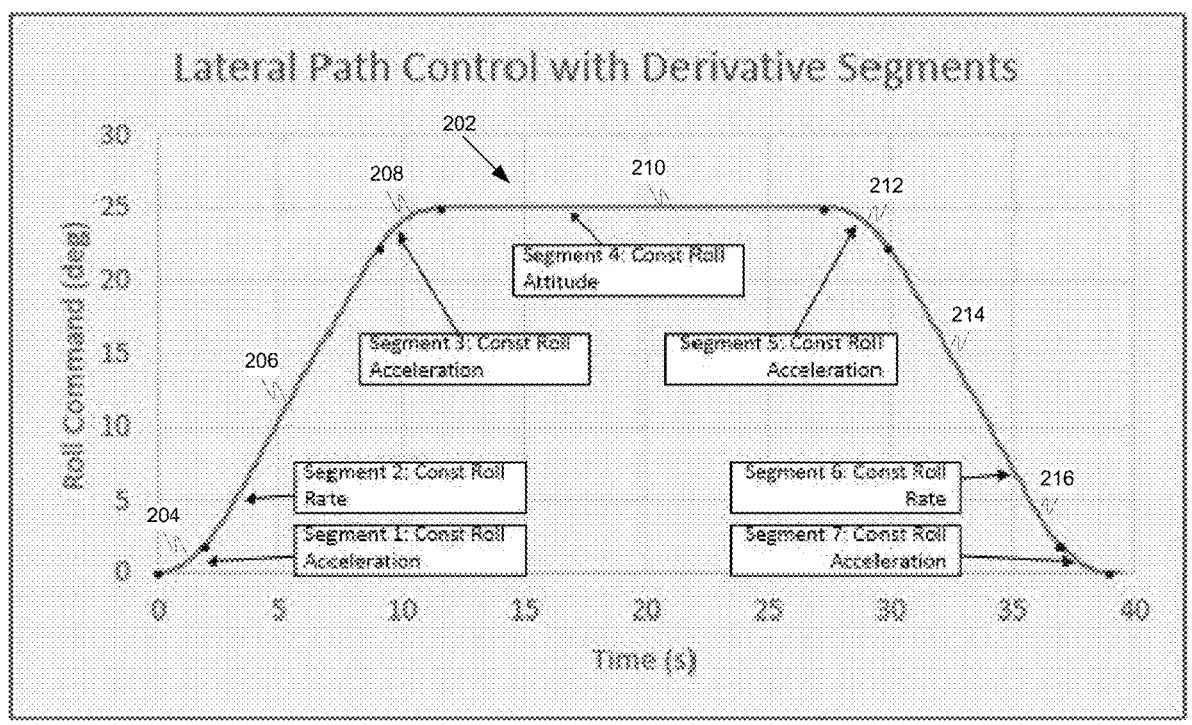
FIG. 2 is a diagram that includes a graph that illustrates example roll commands as a function of time for an example turn procedure in an aircraft, in accordance with some embodiments.

FIG. 2 is a diagram that includes a graph that illustrates example roll commands 202 as a function of time for an example turn procedure in an aircraft. The example roll commands 202 include roll commands for seven segments of the example turn. The segments include a first constant roll acceleration segment 204, a first constant roll rate segment 206, a second constant roll acceleration segment 208, a constant roll angle segment 210, a third constant roll acceleration segment 212, a second constant roll rate segment 214, and a fourth constant roll acceleration segment 216. The constant roll acceleration segments 204, 208, 212, 216 are lateral path segments wherein the aircraft is operated with a constant roll acceleration that will generate a constant aircraft snap. The constant roll rate segments 206, 214, are lateral path segments wherein the aircraft is operated with a constant roll rate that will generate a constant aircraft jerk. The constant roll angle segment 210 is a lateral path segment wherein the aircraft is operated with a constant roll angle, which will generate a constant aircraft acceleration.

The roll derivative segments will generate a variable Phinom corresponding to a roll rate or roll acceleration. This variable Phinom will be used instead of the static PHINOM as an input to the lateral path control law for the constant roll acceleration segments 204, 208, 212, 216 and the constant roll rate segments 206, 214. The variable Phinom can be configured to conform with natural aircraft motion.

The nominal roll command ($\Phi_{CMD}$) during the derivative segments can be expressed using the following equation:
Equation 1: $\Phi_{CMD} = \Phi_0 + \Phi''_0 t + \frac{1}{2}\Phi'' t^2$, wherein $\Phi_0$ is the initial roll angle; $\Phi'_0$ is the initial roll angle rate; and $\Phi''$ is roll acceleration.

The roll rate ($\Phi'$) can be expressed using the following equation:

$$\Phi' = \Phi'_0 + \Phi'' t. \quad \text{Equation 2:}$$

The turn rate ($\omega$) can be expressed with the following equation:

$$\omega = \operatorname{Tan}\Phi g/V_g, \quad \text{Equation 3:}$$

wherein $\Phi g$ is roll angle times gravitational constant; and $V_g$ is ground speed.

The track change ($\Delta\omega$) can be expressed with the following equation:

$$\Delta\omega = \omega t \quad \text{Equation 4:}$$

The instantaneous track change during the maneuver as a function of time can be expressed with the following integration:

$$\text{Track Change} = \int \tan(\Phi_0 + \Phi'_0 t + \frac{1}{2}\Phi'' t^2) dt * g/V_g \quad \text{Equation 5:}$$

The form of this integral can't be solved directly, so a Taylor Series expansion is used and is the following:

$$\text{Track Change} = t*\tan(\Phi_0) + \frac{1}{2}\Phi'_0 t^2 \operatorname{Sec}^2(\Phi_0) + \frac{1}{3}t^3 \operatorname{Sec}^2(\Phi_0)(\Phi'^2_0 \operatorname{Tan}(\Phi_0) + \frac{1}{2}\Phi'')*g/V_g \quad \text{Equation 6:}$$

The TKE is determined based on the current path track target minus the current aircraft track. Equation 6 allows for determining the instantaneous desired track to compute TKE. The maneuver will be initialized and using the current time after initialization. The target track change can be computed by comparing the aircraft track to the time based track expected from equation 6.

The XTK is determined based on the difference between the expected aircraft X/Y position and the actual aircraft X/Y position. The expected X/Y position can be computed by integrating through the derivative segments using equation 6 and comparing the result to the aircraft position.

Controlling the aircraft to follow a path that includes the derivative segments will allow the aircraft to roll up and down in accordance with a natural motion of an aircraft. This motion will be controllable and allow the prescribed path to be followed much more closely than when using other methods. Using these techniques can reduce error generation and allow aircraft to fly in parallel paths with much smaller tolerances.

The apparatus, systems, techniques and articles for adding derivative lateral path segments before and after straight to curve or curve to straight transitions can be implemented by a controller in the FMS or in some other avionic component. The controller includes at least one processor and a computer-readable storage device or media encoded with programming instructions for configuring the controller. The processor may be any custom-made or commercially available processor, a central processing unit (CPU), a graphics processing unit (GPU), an application specific integrated circuit (ASIC), a field programmable gate array (FPGA), an auxiliary processor among several processors associated with the controller, a semiconductor-based microprocessor (in the form of a microchip or chip set), any combination thereof, or generally any device for executing instructions.

The computer readable storage device or media may include volatile and nonvolatile storage in read-only memory (ROM), random-access memory (RAM), and keep-alive memory (KAM), for example. KAM is a persistent or non-volatile memory that may be used to store various operating variables while the processor is powered down. The computer-readable storage device or media may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable programming instructions, used by the controller.

Figure 3:
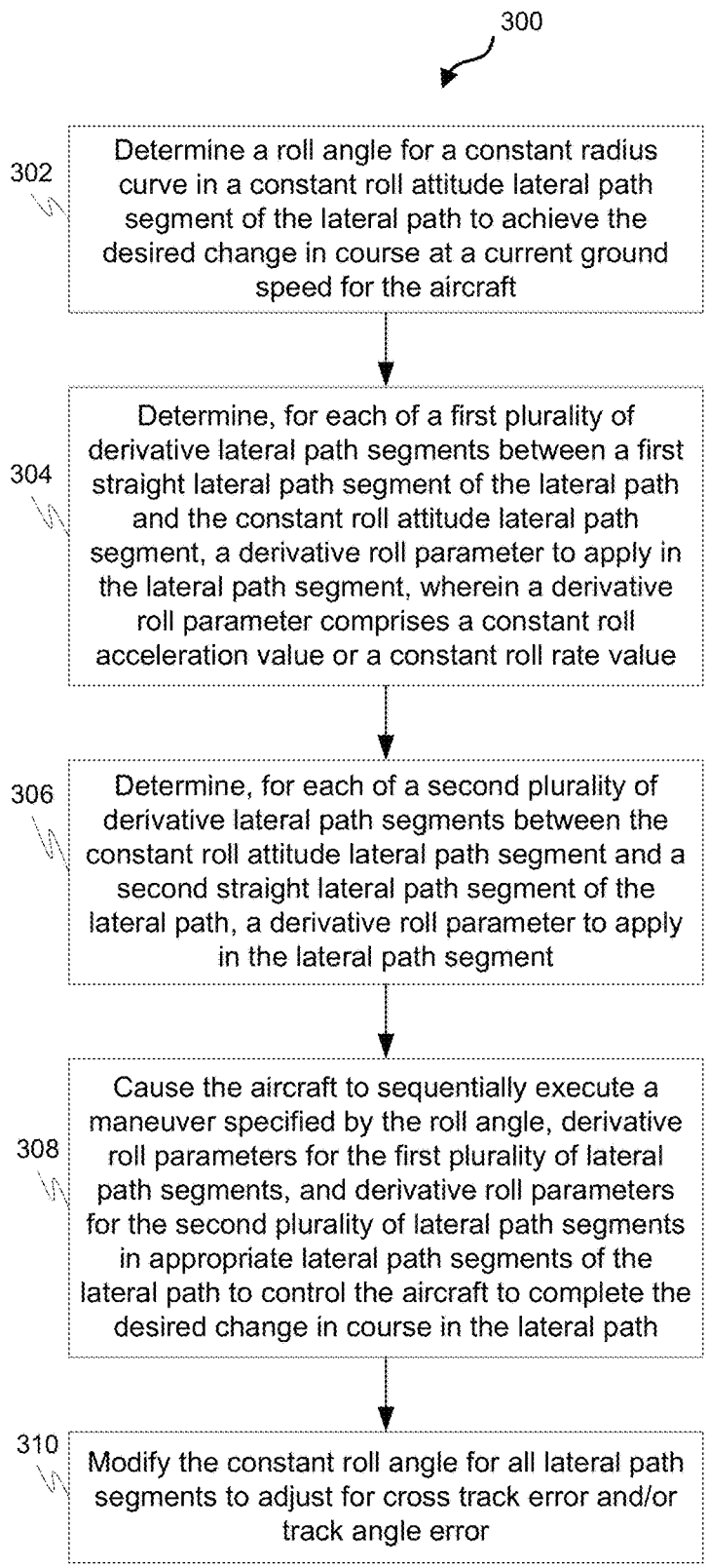
FIG. 3 is a process flow chart depicting an example process in flight deck equipment for controlling a desired change in course in a lateral path of an aircraft, in accordance with some embodiments.

FIG. 3 is a process flow chart depicting an example process 300 in flight deck equipment for controlling a desired change in course in a lateral path of an aircraft. The order of operation within the process 300 is not limited to the sequential execution as illustrated in the figure, but may be performed in one or more varying orders as applicable and in accordance with the present disclosure.

The example process 300 includes determining a roll angle for a constant radius curve in a constant roll attitude lateral path segment of the lateral path to achieve the desired change in course at a current ground speed for the aircraft (operation 302).

The example process 300 includes determining, for each of a first plurality of derivative lateral path segments between a first straight lateral path segment of the lateral path and the constant roll attitude lateral path segment, a derivative roll parameter to apply in the lateral path segment, wherein the derivative roll parameter comprises a constant roll acceleration value or a constant roll rate value (operation 304). The first plurality of derivative lateral path segments comprises a first constant roll acceleration lateral path segment, a first constant roll rate lateral path segment, and a second constant roll acceleration lateral path segment. The determining, for each of the first plurality of derivative lateral path segments, a derivative roll parameter to apply may comprise: determining a starting point and a constant roll acceleration for the first constant roll acceleration lateral path segment; determining a starting point and a constant roll rate for the first constant roll rate lateral path segment; and determining a starting point and a constant roll acceleration for the second constant roll acceleration lateral path segment.

The example process 300 includes determining, for each of a second plurality of derivative lateral path segments between the constant roll attitude lateral path segment and a second straight lateral path segment of the lateral path, a derivative roll parameter to apply in the lateral path segment (operation 306). The second plurality of derivative lateral path segments comprises a third constant roll acceleration lateral path segment, a second constant roll rate lateral path segment, and a third constant roll acceleration lateral path segment. The determining, for each of the second plurality of derivative lateral path segments, a derivative roll parameter to apply may comprise: determining a starting point and a constant roll acceleration for the third constant roll acceleration lateral path segment; determining a starting point and a constant roll rate for the second constant roll rate lateral path segment; and determining a starting point, ending point, and a constant roll acceleration for the fourth constant roll acceleration lateral path segment.

The example process 300 includes causing the aircraft to sequentially execute a maneuver specified by the roll angle, derivative roll parameters for the first plurality of lateral path segments, and derivative roll parameters for the second plurality of lateral path segments in appropriate lateral path segments of the lateral path to control the aircraft to complete the desired change in course in the lateral path (operation 308).

The example process 300 includes modifying the constant roll angle for all lateral path segments to adjust for cross track error and/or track angle error (operation 310). The lateral path includes, in order, the first straight lateral path segment, the first plurality of derivative lateral path segments, the constant roll attitude lateral path segment, the second plurality of derivative lateral path segments, and the second straight lateral path segment.

Described herein are apparatus, systems, techniques and articles for adding derivative lateral path segments before and after straight to curve or curve to straight transitions that allow an aircraft to remain on path at transitions and generate a lower XTK error than would be generated if the derivative lateral path segments before and after straight to curve or curve to straight transitions were not used.

In one embodiment, flight deck equipment comprising a controller for controlling a desired change in course in a lateral path of an aircraft is provided. The controller is configured to: determine a roll angle for a constant radius curve in a constant roll attitude lateral path segment of the lateral path to achieve the desired change in course at a current ground speed for the aircraft; determine, for each of a first plurality of derivative lateral path segments between a first straight lateral path segment of the lateral path and the constant roll attitude lateral path segment, a derivative roll parameter to apply in the lateral path segment, wherein the derivative roll parameter comprises a constant roll acceleration value or a constant roll rate value; determine, for each of a second plurality of derivative lateral path segments between the constant roll attitude lateral path segment and a second straight lateral path segment of the lateral path, a derivative roll parameter to apply in the lateral path segment; and cause the aircraft to sequentially execute a maneuver specified by the roll angle, derivative roll parameters for the first plurality of lateral path segments, and derivative roll parameters for the second plurality of lateral path segments in appropriate lateral path segments of the lateral path to control the aircraft to complete the desired change in course in the lateral path. The lateral path includes, in order, the first straight lateral path segment, the first plurality of derivative lateral path segments, the constant roll attitude lateral path segment, the second plurality of derivative lateral path segments, and the second straight lateral path segment.

These aspects and other embodiments may include one or more of the following features. The controller may be further configured to modify the roll angle for all lateral path segments to adjust for cross track error and/or track angle error. The first plurality of derivative lateral path segments may comprise three derivative lateral path segments. The second plurality of derivative lateral path segments may comprise three derivative lateral path segments. The first plurality of derivative lateral path segments may comprise a first constant roll acceleration lateral path segment, a first constant roll rate lateral path segment, and a second constant roll acceleration lateral path segment. The second plurality of derivative lateral path segments may comprise a third constant roll acceleration lateral path segment, a second constant roll rate lateral path segment, and a third constant roll acceleration lateral path segment. To determine, for each of the first plurality of derivative lateral path segments, a derivative roll parameter to apply, the controller may be further configured to determine a starting point for each of the first plurality of derivative lateral path segments. To determine, for each of the second plurality of derivative lateral path segments, a derivative roll parameter to apply, the controller may be further configured to determine a starting point for each of the second plurality of derivative lateral path segments. To determine, for each of the first plurality of derivative lateral path segments, a derivative roll parameter to apply, the controller may be further configured to: determine a starting point and a constant roll acceleration for the first constant roll acceleration lateral path segment; determine a starting point and a constant roll rate for the first constant roll rate lateral path segment; and determine a starting point and a constant roll acceleration for the second constant roll acceleration lateral path segment. To determine, for each of the second plurality of derivative lateral path segments, a derivative roll parameter to apply, the controller may be further configured to: determine a starting point and a constant roll acceleration for the third constant roll acceleration lateral path segment; determine a starting point and a constant roll rate for the second constant roll rate lateral path segment; and determine a starting point, ending point, and a constant roll acceleration for the fourth constant roll acceleration lateral path segment.

In another embodiment, a method in flight deck equipment for controlling a desired change in course in a lateral path of an aircraft is provided. The method comprises: determining a roll angle for a constant radius curve in a constant roll attitude lateral path segment of the lateral path to achieve the desired change in course at a current ground speed for the aircraft; determining, for each of a first plurality of derivative lateral path segments between a first straight lateral path segment of the lateral path and the constant roll attitude lateral path segment, a derivative roll parameter to apply in the lateral path segment, wherein the derivative roll parameter comprises a constant roll acceleration value or a constant roll rate value; determining, for each of a second plurality of derivative lateral path segments between the constant roll attitude lateral path segment and a second straight lateral path segment of the lateral path, a derivative roll parameter to apply in the lateral path segment; and causing the aircraft to sequentially execute a maneuver specified by the roll angle, derivative roll parameters for the first plurality of lateral path segments, and derivative roll parameters for the second plurality of lateral path segments in appropriate lateral path segments of the lateral path to control the aircraft to complete the desired change in course in the lateral path. The lateral path includes, in order, the first straight lateral path segment, the first plurality of derivative lateral path segments, the constant roll attitude lateral path segment, the second plurality of derivative lateral path segments, and the second straight lateral path segment.

These aspects and other embodiments may include one or more of the following features. The method may further comprise modifying the roll angle for all lateral path segments to adjust for cross track error and/or track angle error. The first plurality of derivative lateral path segments may comprise a first constant roll acceleration lateral path segment, a first constant roll rate lateral path segment, and a second constant roll acceleration lateral path segment; and the second plurality of derivative lateral path segments may comprise a third constant roll acceleration lateral path segment, a second constant roll rate lateral path segment, and a third constant roll acceleration lateral path segment. The determining, for each of the first plurality of derivative lateral path segments, a derivative roll parameter to apply may comprise determining a starting point for each of the first plurality of derivative lateral path segments; and the determining, for each of the second plurality of derivative lateral path segments, a derivative roll parameter to apply may comprise determining a starting point for each of the second plurality of derivative lateral path segments. The determining, for each of the first plurality of derivative lateral path segments, a derivative roll parameter to apply may comprise: determining a starting point and a constant roll acceleration for the first constant roll acceleration lateral path segment; determining a starting point and a constant roll rate for the first constant roll rate lateral path segment; and determining a starting point and a constant roll acceleration for the second constant roll acceleration lateral path segment. The determining, for each of the second plurality of derivative lateral path segments, a derivative roll parameter to apply may comprise: determining a starting point and a constant roll acceleration for the third constant roll acceleration lateral path segment; determining a starting point and a constant roll rate for the second constant roll rate lateral path segment; and determining a starting point, ending point, and a constant roll acceleration for the fourth constant roll acceleration lateral path segment.

In another embodiment, a flight management system (FMS) in an aircraft is provided. The FMS comprises a controller for controlling a desired change in course in a lateral path of the aircraft. The controller is configured to: determine a roll angle for a constant radius curve in a constant roll attitude lateral path segment of the lateral path to achieve the desired change in course at a current ground speed for the aircraft; determine, for each of a first plurality of derivative lateral path segments between a first straight lateral path segment of the lateral path and the constant roll attitude lateral path segment, a derivative roll parameter to apply in the lateral path segment, wherein the derivative roll parameter comprises a constant roll acceleration value or a constant roll rate value; determine, for each of a second plurality of derivative lateral path segments between the constant roll attitude lateral path segment and a second straight lateral path segment of the lateral path, a derivative roll parameter to apply in the lateral path segment; cause the aircraft to sequentially execute a maneuver specified by the roll angle, derivative roll parameters for the first plurality of lateral path segments, and derivative roll parameters for the second plurality of lateral path segments in appropriate lateral path segments of the lateral path to control the aircraft to complete the desired change in course in the lateral path; and modify the constant roll angle for all lateral path segments to adjust for cross track error and/or track angle error. The lateral path includes, in order, the first straight lateral path segment, the first plurality of derivative lateral path segments, the constant roll attitude lateral path segment, the second plurality of derivative lateral path segments, and the second straight lateral path segment.

These aspects and other embodiments may include one or more of the following features. The first plurality of derivative lateral path segments may comprise a first constant roll acceleration lateral path segment, a first constant roll rate lateral path segment, and a second constant roll acceleration lateral path segment; and the second plurality of derivative lateral path segments may comprise a third constant roll acceleration lateral path segment, a second constant roll rate lateral path segment, and a third constant roll acceleration lateral path segment. To determine, for each of the first plurality of derivative lateral path segments, a derivative roll parameter to apply, the controller may be further configured to: determine a starting point and a constant roll acceleration for the first constant roll acceleration lateral path segment; determine a starting point and a constant roll rate for the first constant roll rate lateral path segment; and determine a starting point and a constant roll acceleration for the second constant roll acceleration lateral path segment. To determine, for each of the second plurality of derivative lateral path segments, a derivative roll parameter to apply, the controller may be further configured to: determine a starting point and a constant roll acceleration for the third constant roll acceleration lateral path segment; determine a starting point and a constant roll rate for the second constant roll rate lateral path segment; and determine a starting point, ending point, and a constant roll acceleration for the fourth constant roll acceleration lateral path segment.

In another embodiment, a method in flight deck equipment for controlling a change in desired course in an aircraft is provided. The method comprises: dividing the turn to the desired course into seven segments and determine for each segment a starting point and a roll parameter for the segment; determining a starting point and a constant roll acceleration for the first segment of the turn; determining a starting point and a constant roll rate for the second segment of the turn; determining a starting point and a constant roll acceleration for the third segment of the turn; determining a starting point and a constant roll angle for the fourth segment of the turn that allows the aircraft to turn to the desired course; determining a starting point and a constant roll acceleration for the fifth segment of the turn; determining a starting point and a constant roll rate for the sixth segment of the turn; determining a starting point, ending point, and a constant roll acceleration for the seventh segment of the turn; causing the aircraft to sequentially execute a maneuver specified by the roll parameter for each of the seven segments beginning at the starting point for the segment for the duration of the segment to cause the aircraft to turn to the desired course; and modifying the constant roll angle for all segments to adjust for cross track error and/or track angle error.

In another embodiment, flight deck equipment having a controller for controlling a change in desired course in an aircraft is provided. The controller is configured to: divide the turn to the desired course into seven segments and determine for each segment a starting point and a roll parameter for the segment; determine a starting point and a constant roll acceleration for the first segment of the turn; determine a starting point and a constant roll rate for the second segment of the turn; determine a starting point and a constant roll acceleration for the third segment of the turn; determine a starting point and a constant roll angle for the fourth segment of the turn that allows the aircraft to turn to the desired course; determine a starting point and a constant roll acceleration for the fifth segment of the turn; determine a starting point and a constant roll rate for the sixth segment of the turn; determine a starting point, ending point, and a constant roll acceleration for the seventh segment of the turn; cause the aircraft to sequentially execute a maneuver specified by the roll parameter for each of the seven segments beginning at the starting point for the segment for the duration of the segment to cause the aircraft to turn to the desired course; and modify the constant roll angle for all segments to adjust for cross track error and/or track angle error.

Those of skill in the art will appreciate that the various illustrative logical blocks, modules, circuits, and algorithm steps described in connection with the embodiments disclosed herein may be implemented as electronic hardware, computer software, or combinations of both. Some of the embodiments and implementations are described above in terms of functional and/or logical block components (or modules) and various processing steps. However, it should be appreciated that such block components (or modules) may be realized by any number of hardware, software, and/or firmware components configured to perform the specified functions. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention. For example, an embodiment of a system or a component may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments described herein are merely exemplary implementations.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In this document, relational terms such as first and second, and the like may be used solely to distinguish one entity or action from another entity or action without necessarily requiring or implying any actual such relationship or order between such entities or actions. Numerical ordinals such as "first," "second," "third," etc. simply denote different singles of a plurality and do not imply any order or sequence unless specifically defined by the claim language. The sequence of the text in any of the claims does not imply that process steps must be performed in a temporal or logical order according to such sequence unless it is specifically defined by the language of the claim. The process steps may be interchanged in any order without departing from the scope of the invention as long as such an interchange does not contradict the claim language and is not logically nonsensical.

Furthermore, depending on the context, words such as "connect" or "coupled to" used in describing a relationship between different elements do not imply that a direct physical connection must be made between these elements. For example, two elements may be connected to each other physically, electronically, logically, or in any other manner, through one or more additional elements.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

What is claimed is:

1. Flight deck equipment comprising a controller for controlling a desired change in course in a lateral path of an aircraft, the controller configured to:
   determine a roll angle for a constant radius curve in a constant roll attitude lateral path segment of the lateral path to achieve the desired change in course at a current ground speed for the aircraft;
   determine, for each of a first plurality of derivative lateral path segments between a first straight lateral path segment of the lateral path and the constant roll attitude lateral path segment, a derivative roll parameter to apply in the lateral path segment, wherein the derivative roll parameter comprises a constant roll acceleration value or a constant roll rate value;
   determine, for each of a second plurality of derivative lateral path segments between the constant roll attitude lateral path segment and a second straight lateral path segment of the lateral path, a derivative roll parameter to apply in the lateral path segment; and cause the aircraft to sequentially execute a maneuver specified by the roll angle, derivative roll parameters for the first plurality of lateral path segments, and derivative roll parameters for the second plurality of lateral path segments in appropriate lateral path segments of the lateral path to control the aircraft to complete the desired change in course in the lateral path;

wherein the lateral path includes, in order, the first straight lateral path segment, the first plurality of derivative lateral path segments, the constant roll attitude lateral path segment, the second plurality of derivative lateral path segments, and the second straight lateral path segment.

2. The flight deck equipment of claim 1, wherein the controller is further configured to:

modify the roll angle for all lateral path segments to adjust for cross track error and/or track angle error.

3. The flight deck equipment of claim 1, wherein the first plurality of derivative lateral path segments comprises three derivative lateral path segments.

4. The flight deck equipment of claim 3, wherein the second plurality of derivative lateral path segments comprises three derivative lateral path segments.

5. The flight deck equipment of claim 4, wherein the first plurality of derivative lateral path segments comprises a first constant roll acceleration lateral path segment, a first constant roll rate lateral path segment, and a second constant roll acceleration lateral path segment.

6. The flight deck equipment of claim 5, wherein the second plurality of derivative lateral path segments comprises a third constant roll acceleration lateral path segment, a second constant roll rate lateral path segment, and a third constant roll acceleration lateral path segment.

7. The flight deck equipment of claim 6, wherein to determine, for each of the first plurality of derivative lateral path segments, a derivative roll parameter to apply the controller is further configured to determine a starting point for each of the first plurality of derivative lateral path segments.

8. The flight deck equipment of claim 7, wherein to determine, for each of the second plurality of derivative lateral path segments, a derivative roll parameter to apply the controller is further configured to determine a starting point for each of the second plurality of derivative lateral path segments.

9. The flight deck equipment of claim 6, wherein to determine, for each of the first plurality of derivative lateral path segments, a derivative roll parameter to apply the controller is further configured to:

determine a starting point and a constant roll acceleration for the first constant roll acceleration lateral path segment;

determine a starting point and a constant roll rate for the first constant roll rate lateral path segment; and determine a starting point and a constant roll acceleration for the second constant roll acceleration lateral path segment.

10. The flight deck equipment of claim 9, wherein to determine, for each of the second plurality of derivative lateral path segments, a derivative roll parameter to apply the controller is further configured to:

determine a starting point and a constant roll acceleration for the third constant roll acceleration lateral path segment;

determine a starting point and a constant roll rate for the second constant roll rate lateral path segment; and determine a starting point, ending point, and a constant roll acceleration for the fourth constant roll acceleration lateral path segment.

11. A method in flight deck equipment for controlling a desired change in course in a lateral path of an aircraft, the method comprising:

determining a roll angle for a constant radius curve in a constant roll attitude lateral path segment of the lateral path to achieve the desired change in course at a current ground speed for the aircraft;

determining, for each of a first plurality of derivative lateral path segments between a first straight lateral path segment of the lateral path and the constant roll attitude lateral path segment, a derivative roll parameter to apply in the lateral path segment, wherein the derivative roll parameter comprises a constant roll acceleration value or a constant roll rate value;

determining, for each of a second plurality of derivative lateral path segments between the constant roll attitude lateral path segment and a second straight lateral path segment of the lateral path, a derivative roll parameter to apply in the lateral path segment; and causing the aircraft to sequentially execute a maneuver specified by the roll angle, derivative roll parameters for the first plurality of lateral path segments, and derivative roll parameters for the second plurality of lateral path segments in appropriate lateral path segments of the lateral path to control the aircraft to complete the desired change in course in the lateral path;

wherein the lateral path includes, in order, the first straight lateral path segment, the first plurality of derivative lateral path segments, the constant roll attitude lateral path segment, the second plurality of derivative lateral path segments, and the second straight lateral path segment.

12. The method of claim 11, further comprising:

modifying the roll angle for all lateral path segments to adjust for cross track error and/or track angle error.

13. The method of claim 11, wherein:

the first plurality of derivative lateral path segments comprises a first constant roll acceleration lateral path segment, a first constant roll rate lateral path segment, and a second constant roll acceleration lateral path segment; and the second plurality of derivative lateral path segments comprises a third constant roll acceleration lateral path segment, a second constant roll rate lateral path segment, and a third constant roll acceleration lateral path segment.

14. The method of claim 13, wherein:

the determining, for each of the first plurality of derivative lateral path segments, a derivative roll parameter to apply further comprises determining a starting point for each of the first plurality of derivative lateral path segments; and the determining, for each of the second plurality of derivative lateral path segments, a derivative roll parameter to apply further comprises determining a starting point for each of the second plurality of derivative lateral path segments.

15. The method of claim 13, wherein the determining, for each of the first plurality of derivative lateral path segments, a derivative roll parameter to apply comprises:

determining a starting point and a constant roll acceleration for the first constant roll acceleration lateral path segment;

determining a starting point and a constant roll rate for the first constant roll rate lateral path segment; and determining a starting point and a constant roll acceleration for the second constant roll acceleration lateral path segment.

16. The method of claim 15, wherein the determining, for each of the second plurality of derivative lateral path segments, a derivative roll parameter to apply comprises:

determining a starting point and a constant roll acceleration for the third constant roll acceleration lateral path segment;

determining a starting point and a constant roll rate for the second constant roll rate lateral path segment; and determining a starting point, ending point, and a constant roll acceleration for the fourth constant roll acceleration lateral path segment.

17. A flight management system (FMS) in an aircraft, the FMS comprising a controller for controlling a desired change in course in a lateral path of the aircraft, the controller configured to:

determine a roll angle for a constant radius curve in a constant roll attitude lateral path segment of the lateral path to achieve the desired change in course at a current ground speed for the aircraft;

determine, for each of a first plurality of derivative lateral path segments between a first straight lateral path segment of the lateral path and the constant roll attitude lateral path segment, a derivative roll parameter to apply in the lateral path segment, wherein the derivative roll parameter comprises a constant roll acceleration value or a constant roll rate value;

determine, for each of a second plurality of derivative lateral path segments between the constant roll attitude lateral path segment and a second straight lateral path segment of the lateral path, a derivative roll parameter to apply in the lateral path segment; and cause the aircraft to sequentially execute a maneuver specified by the roll angle, derivative roll parameters for the first plurality of lateral path segments, and derivative roll parameters for the second plurality of lateral path segments in appropriate lateral path segments of the lateral path to control the aircraft to complete the desired change in course in the lateral path; and modify the constant roll angle for all lateral path segments to adjust for cross track error and/or track angle error;

wherein the lateral path includes, in order, the first straight lateral path segment, the first plurality of derivative lateral path segments, the constant roll attitude lateral path segment, the second plurality of derivative lateral path segments, and the second straight lateral path segment.

18. The FMS of claim 17, wherein:

the first plurality of derivative lateral path segments comprises a first constant roll acceleration lateral path segment, a first constant roll rate lateral path segment, and a second constant roll acceleration lateral path segment; and the second plurality of derivative lateral path segments comprises a third constant roll acceleration lateral path segment, a second constant roll rate lateral path segment, and a third constant roll acceleration lateral path segment.

19. The FMS of claim 18, wherein to determine, for each of the first plurality of derivative lateral path segments, a derivative roll parameter to apply the controller is further configured to:

determine a starting point and a constant roll acceleration for the first constant roll acceleration lateral path segment;

determine a starting point and a constant roll rate for the first constant roll rate lateral path segment; and determine a starting point and a constant roll acceleration for the second constant roll acceleration lateral path segment.

20. The FMS of claim 19, wherein to determine, for each of the second plurality of derivative lateral path segments, a derivative roll parameter to apply the controller is further configured to:

determine a starting point and a constant roll acceleration for the third constant roll acceleration lateral path segment;

determine a starting point and a constant roll rate for the second constant roll rate lateral path segment; and determine a starting point, ending point, and a constant roll acceleration for the fourth constant roll acceleration lateral path segment.

* * * * *